Nov. 27, 1928.　　　　　　　　　　　　　　1,693,299
W. H. JONES
CLINICAL THERMOMETER
Filed May 8, 1926
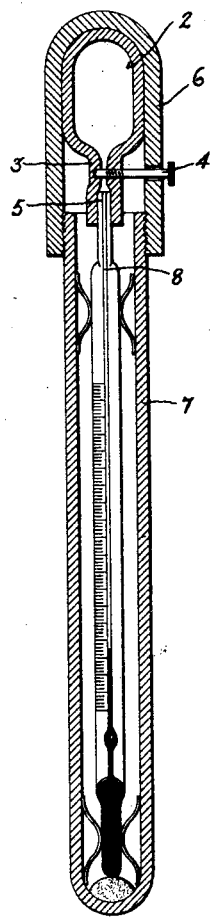
Inventor:
William H. Jones:
by　*[signature]*
His Attorney.

Patented Nov. 27, 1928.

1,693,299

UNITED STATES PATENT OFFICE.

WILLIAM H. JONES, OF SCHENECTADY, NEW YORK, ASSIGNOR TO GENERAL ELECTRIC COMPANY, A CORPORATION OF NEW YORK.

CLINICAL THERMOMETER.

Application filed May 8, 1926. Serial No, 107,767.

In connection with thermometers considerable inconvenience and difficulty are commonly experienced in restoring the mercury to its proper position in the capillary bore before a reading is taken. This is commonly done by whipping the instrument to bring centrifugal action or inertia into play.

It is one of the objects of my invention to provide mechanical means for driving the mercury or other fluid down the capillary bore of the thermometer without having to resort to the old method. With this object in view I provide the thermometer with an open stem and apply a receptacle with compressed air or other gas to the stem, the receptacle being provided with a valve in order to control the application of the compressed gas to the mercury.

My invention will be more readily understood from the following specification and claims and by reference to the accompanying drawing, in which the figure shows the device of my invention in longitudinal section.

Referring more in detail to the drawing, it will be seen that I provide a receptacle 2 with gas under pressure, which receptacle has a neck 3 sufficiently long to accommodate a valve 4 and at the same time to receive the open end 5 of the thermometer. The receptacle 2 may be made of any suitable material strong enough to sustain the gas under pressure. Furthermore, it is preferably made of such a size as to conveniently fit in the cap 6 of the thermometer case 7. It will be understood that after the thermometer has been used the valve 4 in the neck of the receptacle 2 may be opened in order to allow the gas under pressure to pass into the bore 8, thereby forcing the mercury down to its lowest point determined by the surrounding temperature of the instrument. It will be readily seen that after the mercury has been restored the instrument may be again used for taking a reading, after which the cap 6 may then be applied to the case 7 and the valve once more operated to drive the mercury down after the temperature of the instrument has been restored to that of the surrounding medium. The receptacle 2, of course, may be of such a size as to serve for operating the thermometer quite a number of times. In due course a new receptacle 2 may be substituted for the old. This, of course, is repeated at regular intervals.

It will be seen, therefore, that my invention enables a physician or anyone using a thermometer to restore the device to condition for use before the thermometer is removed from its case, thereby avoiding the necessity of jerking the instrument, as is usually done.

It will be understood that while I have illustrated my invention in connection with one specific embodiment, I do not wish to be limited to the particular form shown in the drawing, inasmuch as, in view of the disclosure, modifications may be readily made without departing from the spirit of the invention or the scope of the claims contained herein.

What I claim as new and desire to secure by Letters Patent of the United States, is:

1. In combination with a thermometer having a liquid in a bore, a receptacle with a gas under pressure, means for connecting the receptacle with the bore of the thermometer, and a valve in the receptacle for controlling the application of the gas from the receptacle to the liquid in the bore to drive the liquid down the bore.

2. In combination with a thermometer containing a liquid in the bore thereof, a receptacle with a gas under pressure, means for connecting the receptacle with the bore of the thermometer, a valve in the receptacle for controlling the application of the gas from the receptacle to the liquid in the bore to drive the liquid down, a case for the thermometer, and a cap for the case for holding the receptacle with the gas under pressure.

3. In combination with a thermometer having a liquid in a bore, a receptacle with a gas under pressure, means for connecting the receptacle with the bore of the thermometer, a valve in the receptacle for controlling the application of the gas from the receptacle to the liquid in the bore to drive the latter down the bore, a case for the thermometer, and a cap for the case and for holding the receptacle with the gas under pressure, the stem of said valve extending from the receptacle through the cap whereby the valve may be operated before the cap is removed from the case.

4. In combination, a mercury thermometer with an open bore and a receptacle with a gas under pressure, said receptacle structurally formed and located to connect with the bore means for connecting the bore with the receptacle and a valve between the bore and the receptacle for controlling the application of gas from the receptacle to the bore to force the mercury down the bore.

In witness whereof, I have hereunto set my hand this 7th day of May, 1926.

WILLIAM H. JONES.